United States Patent [19]

Edelson

[11] 4,313,548
[45] Feb. 2, 1982

[54] HANDLEBAR PACK AND SUPPORT FOR BICYCLE

[76] Inventor: Jack Edelson, 1161 Mission St., San Francisco, Calif. 94103

[21] Appl. No.: 222,659

[22] Filed: Jan. 5, 1981

[51] Int. Cl.³ .............................................. B62J 7/06
[52] U.S. Cl. ........................................ 224/36; 224/42
[58] Field of Search ............... 224/36, 30 A, 32 R, 224/32 A, 39, 41, 42; 248/311.2

[56] References Cited

U.S. PATENT DOCUMENTS

| 569,813 | 10/1896 | Chamberlain | 224/42 |
| 595,517 | 12/1897 | Baker | 224/42 |
| 637,762 | 11/1899 | Buley et al. | 224/42 |
| 1,400,758 | 12/1921 | Mansfield | 224/41 |
| 2,128,174 | 8/1938 | Smith | 224/36 |
| 3,955,728 | 5/1976 | Jackson et al. | 224/36 X |
| 4,056,219 | 11/1977 | Hine, Jr. | 224/36 |
| 4,066,196 | 1/1978 | Jackson et al. | 224/36 X |
| 4,260,086 | 4/1981 | Hine, Jr. et al. | 224/36 |

Primary Examiner—Steven M. Pollard
Attorney, Agent, or Firm—Alfons Puishes

[57] ABSTRACT

A pack or carrier bag for attachment to the handlebars of a bicycle utilizes a specially constructed combination of a cleat fastened to the bag which is engaged by a hook which in turn engages the handlebar structure and the combination provides for rapid placement of the pack in position. Flexible fasteners connecting a bag with the bicycle structure assures stability of the pack and maintains its position on the handlebars while the bicycle is in motion.

8 Claims, 3 Drawing Figures

HANDLEBAR PACK AND SUPPORT FOR BICYCLE

BACKGROUND OF THE INVENTION

Carriers for various materials which are attached to the handlebar of a bicycle have been used for many years. These formerly took the form of wire baskets with suitable hooks and clamps to hold them in position on the handlebars. Later more elaborate bags or containers were introduced which were made of solid material, such as leather or nylon and equipped with closed covers and utilized special structures for holding them in position on the bicycle.

As known to the applicant at this time, the prior patent art is set forth below:

U.S. Pat. No. 569,813 to Chamberlain. It merely discloses a pair of hooks engaging the handlebars and arranged to suspend the handle of a handbag therefrom.

Another old U.S. Pat. No. 595,517 to Baker likewise teaches a special wire hook constructed to engage the handlebars and suspend a piece of luggage therefrom.

Mansfield, U.S. Pat. No. 1,400,758 represents the wire basket type of carrier mentioned above and merely teaches a loop engaging the handlebars and providing brackets and arms to support the basket therefrom.

Hine, U.S. Pat. No. 4,056,219 is a more modern type and discloses a pack supported by a bracket frame which in effect surrounds the pack through pockets therein and incorporates a hook on the handlebar gooseneck for traditional tie to the bicycle frame. It is not adapted for quick installation and removal from the bicycle.

Patent to Jackson U.S. Pat. No. 4,066,196 is somewhat similar to Hine and it teaches a wire frame attached to the handlebars and constructed to be inserted through eyelets forming a part of the bag and in effect surrounding it. It is constructed to be steadied to the axle in front of the bicycle by resilient tension members. It is likewise not adapted for rapid installation or removal from the bicycle handlebars as is the case with applicant's invention.

SUMMARY OF THE INVENTION

I have invented a pack or carrier bag construction and method of support on bicycle handlebars which overcomes the objections set forth on previous devices and fills a long felt need.

My invention comprises a bag of rigidly reinforced construction to which is securely fastened a specially constructed connecting member or cleat. This connecting element is especially constructed to receive a hook which engages the handlebars in such a manner that the bag may be merely dropped over the hook and its position on the bicycle is further secured by means of a resilient connecting member which engages the bag and holds it against the structural frame of the bicycle. Additional security may be obtained by utilizing flexible or resilient connectors from the bag to the front axle of the bicycle.

DESCRIPTION OF A PREFERRED EMBODIMENT

Figure 1:
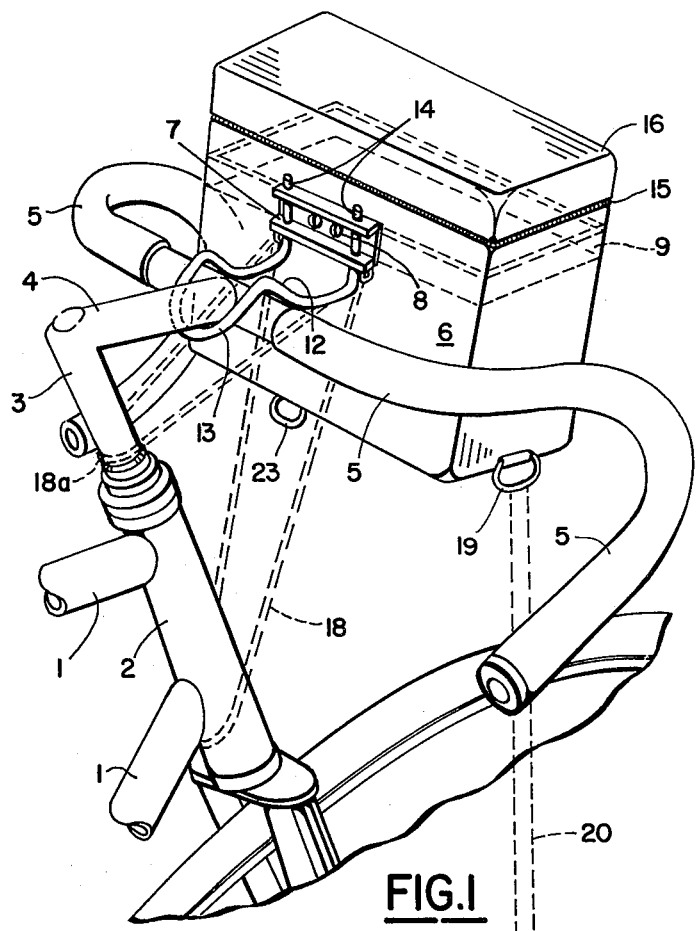
FIG. 1 is a partial view of the front of a bicycle in the handlebar area shown in perspective with the bag in position.
Figure 3:
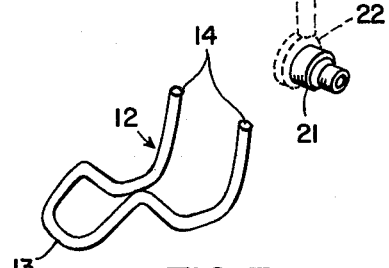
FIG. 3 is a perspective of the hook of my invention.

Referring now to the figures and particularly first to FIG. 1, there are seen parts of the bicycle frame structure 1 connecting with the steering column housing 2. Positioned inside housing 2 is steering column 3 which carries the gooseneck handlebar support 4 which in effect forms a part of the handlebars 5.

Figure 2:
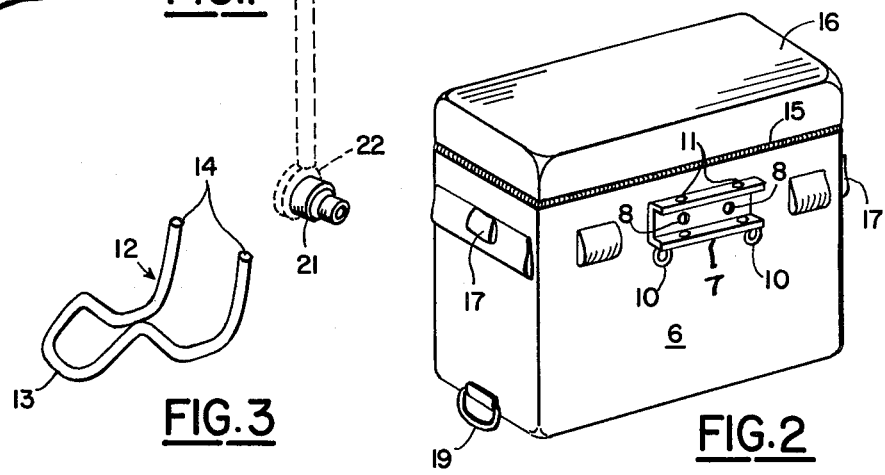
FIG. 2 is a perspective view of the bag itself.

The pack itself, which I may make of nylon with a plastic sheet of interior lining if desired, is seen at 6 and shown separately on FIG. 2. Positioned on the exterior wall of pack 6 is a cleat 7 which may be seen in greater detail on FIG. 2. Cleat 7 is secured by means of fastening screws or bolts 8 to an interior reinforcing frame 9 which may be made of steel or a strong solid plastic material and is constructed to tightly engage the interior of the pack on all four sides.

I may employ a pair of fastening eyes 10 which are fixedly positioned on the ends of the bottom leg of the channel-shaped cleat 7. These serve the purpose of providing a connector for a resilient connecting means which aids in holding the pack against the frame of the bicycle as set forth below.

A pair of holes 11 are drilled through the outwardly protruding legs of the channel-shaped cleat which are disposed to receive the ends of the support hook 12 for rapid placement and removal of the pack from the bicycle. The curved support hook 12 is equipped with a curved clamping section 13 disposed to engage the gooseneck 4 of the bicycle and is equipped with vertical prongs 14 which pass through the holes 11 in cleat 7 for holding pack 6 in position on the handlebars as described above.

Pack 6 is equipped with a closed cover 16 which is joined to the body of pack 6 by means of a zipper 15 and is also equipped with handles 17.

In order to improve the stability of the pack and maintain its position on the handlebars, I utilize an upper fastening means 18 made of a resilient material. This may be made to detachably engage the eyes 10 on my cleat and thus hold the bag against the frame of the bicycle, either around the bicycle steering column housing 2 or the steering column itself 3 as shown at 18a. I may also arrange the ends of my fastener 18a to engage the protruding ends of prongs 14 for support if desired.

To further improve the stability of my pack on the bicycle when the latter is in motion, I provide rings 19 which are fastened to the ends of the pack on opposite sides. To these rings I detachably engage one end of a bottom fastening member of resilient material 20, the opposite end of which is secured to the protruding end of the front wheel bicycle axle 21 by means of a special ring 22 provided for this purpose.

In an alternative embodiment as an additional support to the bicycle, I provide a ring 23 fastened to the bottom of the pack on the side facing the handlebars. Through this ring I may pass a resilient fastener such as 18, either in addition to or instead of the other fasteners described above.

All of the fasteners are detachably secured to the bag for ready installation and replacement.

It is thus seen that my construction provides a maximum of stability for my pack while the bicycle is in motion while permitting rapid installation and replacement of the pack on the bicycle handlebars. This is a property which is not possessed by previous devices in this class.

I claim:

1. A handlebar pack and support for a bicycle comprising:
   a pack of generally rectangular configuration;
   a rigid reinforcing member positioned around the interior of said pack and fixedly attached to the interior walls thereof;
   a cleat in the form of a channel having its bottom flat section positioned horizontally on an exterior wall of said pack;
   said cleat being characterized by:
      means for fastening said cleat to said reinforcing member through said wall of said pack;
      a pair of holes through the horizontally projecting legs of said channel oppositely spaced adjacent the ends thereof;
   a curved hook having a clamping central section engaging a gooseneck supporting the handlebars of said bicycle;
   said hook having a pair of vertical prongs at the end thereof;
   said prongs engaging the holes in said channel legs;
   resilient fastening means detachably engaging said pack and the frame of said bicycle.

2. A handlebar pack and support for a bicycle comprising:
   a pack of generally rectangular configuration;
   a rigid reinforcing member positioned around the interior of said pack and fixedly attached to the interior walls thereof;
   a cleat in the form of a channel having its bottom flat section positioned horizontally on an exterior wall of said pack;
   said cleat being characterized by:
      means for fastening said cleat to said reinforcing member through said wall of said pack;
      a pair of holes through the horizontally projecting legs of said channel oppositely spaced adjacent the ends thereof;
      a pair of eyes fixedly positioned on the lower horizontally projecting legs of said channel at opposite ends thereof;
   a curved hook having a clamping central section engaging a gooseneck supporting the handlebars of said bicycle;
   said hook having a pair of vertical prongs at the end thereof;
   said prongs engaging the holes in said channel legs;
   resilient fastening means detachably engaging said eyes on said channel and the frame of said bicycle.

3. The device of claim 1 or claim 2 including:
   a pair of rings attached to opposite ends of said pack;
   a pair of resilient fastening means each having one end detachably engaging each of said rings;
   said fastening means having opposite ends each detachably engaging an opposite end of a front axle of said bicycle.

4. The device of claim 1 or claim 2 in which said resilient fastening means detachably engages the ends of said vertical prongs of said hook.

5. The device of claim 1 or claim 2 in which said pack is equipped with a removable cover said cover being attached to the body of said pack by means of a zipper fastener.

6. The device of claim 1 or claim 2 in which said pack is made of nylon and is equipped with a plastic liner.

7. A handlebar pack and support for a bicycle comprising:
   a pack;
   a cleat fastened to an exterior wall of said pack;
   a pair of generally vertical holes through said cleat;
   a curved hook having a central section for engaging the handlebars of said bicycle;
   said hook having a pair of generally vertical prongs at the end thereof disposed to engage the holes in said cleat;
   resilient fastening means detachably engaging said pack and the frame of said bicycle.

8. The device of claim 7 in which said cleat is shorter than the horizontal length of said pack and said prongs are spaced apart a distance less than the length of said pack.

* * * * *